(12) United States Patent
Han et al.

(10) Patent No.: US 11,352,084 B2
(45) Date of Patent: Jun. 7, 2022

(54) MULTI-DEGREE-OF-FREEDOM RIDING SADDLE

(71) Applicant: Shejun Han, Henan (CN)

(72) Inventors: Yunlong Han, Luoyang (CN); Jia'ning Wang, Luoyang (CN)

(73) Assignee: Shejun Han, Luoyang (CN)

( * ) Notice: Subject to any disclaimer, the term of this patent is extended or adjusted under 35 U.S.C. 154(b) by 0 days.

(21) Appl. No.: 17/053,830

(22) PCT Filed: Apr. 10, 2019

(86) PCT No.: PCT/CN2019/081986
§ 371 (c)(1),
(2) Date: Nov. 9, 2020

(87) PCT Pub. No.: WO2019/214386
PCT Pub. Date: Nov. 14, 2019

(65) Prior Publication Data
US 2021/0114676 A1 Apr. 22, 2021

(30) Foreign Application Priority Data
May 9, 2018 (CN) .......................... 201810436549.3

(51) Int. Cl.
*B62J 1/10* (2006.01)
*B62J 1/00* (2006.01)
*B62J 1/08* (2006.01)

(52) U.S. Cl.
CPC ................. *B62J 1/10* (2013.01); *B62J 1/005* (2013.01); *B62J 1/08* (2013.01)

(58) Field of Classification Search
CPC ................. B62J 1/10; B62J 1/005; B62J 1/08
See application file for complete search history.

(56) References Cited

U.S. PATENT DOCUMENTS 4,089,559 A * 5/1978 Prange ..................... B62J 1/002
297/201
4,541,668 A * 9/1985 Rouw ...................... B62J 1/002
297/201

(Continued)

FOREIGN PATENT DOCUMENTS

| CN | 104908852 A | 9/2015 |
| CN | 206202506 U | 5/2017 |

(Continued)

OTHER PUBLICATIONS

Jul. 1, 2019 International Search Report issued in International Patent Application No. PCT/CN2019/081986.

*Primary Examiner* — Philip F Gabler
(74) *Attorney, Agent, or Firm* — Kolitch Romano LLP

(57) ABSTRACT

A multi-degree-of-freedom riding saddle includes a support portion connected to a bicycle frame. A mechanical linkage may connect a first and a second seat plate to the support portion, such that the first and second seat plates each define a floating link of the mechanical linkage. A respective first connecting rod is coupled to a front end of each seat plate, and a respective second connecting rod is coupled to a rear end of each seat plate. A first swing cross rod connects the first connecting rods such that a lowering of a front end of one of the seat plates causes a front end of the other seat plate to rise. A second swing cross rod connects the second connecting rods such that a lowering of a rear end of one of the seat plates causes a rear end of the other seat plate to rise.

11 Claims, 2 Drawing Sheets

(56) References Cited

U.S. PATENT DOCUMENTS

| | | | | |
|---|---|---|---|---|
| 5,725,274 A | * | 3/1998 | Bergmeister | B62J 1/002 |
| | | | | 297/201 |
| 5,988,740 A | * | 11/1999 | Caraballo | B62J 1/002 |
| | | | | 297/201 |
| 6,142,562 A | * | 11/2000 | Varan | B62J 1/005 |
| | | | | 297/195.1 |
| 6,786,542 B1 | * | 9/2004 | Nuzzarello | B62J 1/005 |
| | | | | 297/195.1 |
| 7,494,181 B2 | * | 2/2009 | Tucker | B62J 1/005 |
| | | | | 248/298.1 |
| 9,394,022 B2 | * | 7/2016 | Alink | B62J 1/10 |
| 9,738,341 B2 | * | 8/2017 | Eldredge | B62J 1/005 |
| 10,118,658 B2 | | 11/2018 | Petty | |
| 2017/0073028 A1 | | 3/2017 | Petty | |

FOREIGN PATENT DOCUMENTS

| | | |
|---|---|---|
| CN | 107651055 A | 2/2018 |
| CN | 108382505 A | 8/2018 |
| CN | 208216879 U | 12/2018 |
| FR | 3 055 253 A1 | 3/2018 |

\* cited by examiner

MULTI-DEGREE-OF-FREEDOM RIDING SADDLE

BACKGROUND

Technical Field

The present invention relates to the field of bicycle accessories, and in particular, to a multi-degree-of-freedom riding saddle.

Related Art

With the development of the society and the improvement of people's living standards, bicycles have evolved from a simple means of transportation to an exercise mode that the masses are delighted to hear and see. People of different ages and physiques can get moderate exercise through cycling, and can flexibly formulate exercise routes and exercise intensity plans according to their physical conditions and environmental factors. Cycling has fewer constraints and strong autonomy, and the people can further better contact the nature during exercise, which is good for physical and mental health.

Most of the bicycle saddles in the prior art are designed to have a front tip and a rear wider part integrally. Two legs of a rider are separated on two sides of a protruding tip of the seat. The protruding tip directly rubs against a root of a thigh of the rider. When the rider has ridden for a long time, damage to the skin of the root of the thigh of the rider may be caused. In addition, the protruding tip directly presses a perineum of the rider. For a male rider, long-term pressure on the perineum will inevitably affect blood circulation of the perineum, causing frequent urination, urgency of urination, genital discomfort, and even inflammation due to prolonged hyperemia of a prostate, thereby affecting physical and mental health.

In order to resolve the foregoing problem, a type of seat with separate seat plates has recently appeared on the market. Front ends of the two seat plates may rise and fall as the thighs on two sides of the rider alternately reciprocate during riding, better resolving a problem of pressing the perineum of the rider by the protruding tip of the traditional bicycle saddle. However, a degree of freedom of this kind of bicycle saddle is low, and a movable part is only limited to a front end of the seat plate. During actual riding, heights of rear ends of the two seat plates are still basically unchanged, causing the following problems: For example, when a right thigh exerts force for pedaling, the right thigh exerts force and presses down, and a left thigh rises without exerting force. On the one hand, the left thigh rises and separates from a middle portion and a rear portion of a seat plate on a left side, causing all the pressure to be concentrated between the right thigh and a seat plate on the right side. Such alternately reciprocation will cause intermittent squeezing on two thighs of the rider by the two seat plates of the bicycle saddle, which also causes discomfort to the rider. On the other hand, the middle portion and the rear portion of the two seat plates are always at the same height, so that a force transmission channel between waist force of the rider and force of pedaling feet of the bicycle is blocked too much by the saddling during the pedaling, and the riding is more laborious.

SUMMARY

The present invention is intended to provide a multi-degree-of-freedom riding saddle, so that during riding, two seat plates can not only achieve rising and falling of front ends in an alternating reciprocation linkage mode, but also achieve entire rising and falling of the seat plates during the rising and falling of the front ends, thereby improving comfort and saving labor.

In order to resolve the foregoing technical problems, technical solutions adopted by the present invention are: a multi-degree-of-freedom riding saddle is provided, including a support portion configured to be connected to a bicycle frame and two seat plates disposed respectively corresponding to two thighs on two sides of a rider. A linkage portion is provided between the two seat plates and the support portion. The linkage portion is configured to control front ends of the two seat plates to rise and fall in a riding direction in an alternating reciprocation linkage mode and to control a front end of one of the seat plates in the riding direction pushes, during falling, the other seat plate to rise entirely.

Preferably, the linkage portion includes a first swing cross rod rotatably disposed on the support portion and a first fixed cross rod fixed onto the support portion. Two ends of the first swing cross rod may swing with a riding direction as a central axis. The first fixed cross rod is disposed horizontally and perpendicular to the riding direction. Two ends of the first swing cross rod are hinged to one end of the first connecting rod through the first universal ball joint mechanism. The other end of the first connecting rod is hinged to a seat plate on a corresponding side. A hinge point between the first connecting rod and the seat plate on the corresponding side is located at a front end of the seat plate near the riding direction. Through matching of the first swing cross rod and the two first connecting rods, a front end of one of the two seat plates in the riding direction pushes, during falling, a front end of the other seat plate to rise in the riding direction. A second connecting rod is rotatably provided at two ends of the first fixed cross rod are respectively. A middle portion of the second connecting rod is hinged to the first fixed cross rod and may be rotated with the first fixed cross rod as a central axis. One end of the second connecting rod is hinged to the seat plate on the corresponding side. A hinge point between the second connecting rod and the seat plate on the corresponding side is located on a rear end of the seat plate near the riding direction. A second swing cross rod is further rotatably provided on the support portion. Two ends of the second swing cross rod are respectively matched with one end of the two second connecting rods away from the seat plate, so that a rear end of one of the seat plates in the riding direction pushes, during falling, a rear end of the other seat plate in the riding direction to rise.

Preferably, the support portion includes a first support column. The first fixed cross rod is vertically fixed onto the top of the first support column. The first swing cross rod is rotatably disposed at a bottom end of the first support column. The second swing cross rod is rotatably disposed in a middle portion of the first support column.

Preferably, a limiting cross rod parallel to the first fixed cross rod is fixedly provided in the middle portion of the first support column. The limiting cross rod is disposed at a position at which ends of two second connecting rods away from the seat plate is opposite to a side of the second swing cross rod.

Preferably, a first rotating shaft is vertically fixed at a bottom end of the first support column. A first shaft sleeve is rotatably sleeved on the first rotating shaft. The first shaft sleeve is fixedly connected to a middle portion of the first swing cross rod. A second shaft sleeve is rotatably provided at middle portion of the first support column. The second shaft sleeve is fixedly connected to a middle portion of the second swing cross rod. A third shaft sleeve is fixedly provided at a bottom of the seat plate and at a front end in the riding direction. A third rotating shaft is rotatably provided in the third shaft sleeve. The third rotating shaft is vertically and fixedly connected to one end of the first connecting rod away from the first swing cross rod. A fourth shaft sleeve is fixedly provided at a rear end at the bottom of the seat plate in the riding direction. A fourth rotating shaft is rotatably provided in the fourth shaft sleeve. The fourth rotating shaft is fixedly connected to one end of the second connecting rod away from the second swing cross rod. Two ends of the first fixed cross rod are respectively provided with an fifth shaft sleeve. The fifth shaft sleeve is fixedly connected to a middle portion of the second connecting rod.

Preferably, the second connecting rod includes a hinge portion fixed onto the fifth shaft sleeve and fixed to a fourth rotating shaft, and a deflector rod portion fixed onto the fifth shaft sleeve and matched with a limiting cross rod. An included angle between the hinge portion and the deflector rod portion is 150°-160°.

Preferably, the first universal ball joint mechanism includes a ball fixed to one end of the first swing cross rod and a ball sleeve fixed to one end of the first connecting rod and having a cavity corresponding to a shape of the ball.

In some examples, the linkage portion includes a first swing cross rod rotatably disposed on the support portion and located at a front end in the travel direction, a second swing cross rod rotatably disposed on the support portion and located at a rear end in the travel direction, and a first fixed cross rod fixed onto the support portion and located between the first swing cross rod and the second swing cross rod. Two ends of the first swing cross rod and the second swing cross rod may swing with the riding direction as a central axis. The first fixed cross rod is disposed horizontally and perpendicular to the riding direction. Two ends of the first swing cross rod are hinged to one end of a first connecting rod through a first universal ball joint mechanism. The other end of the first connecting rod is hinged to a seat plate on a corresponding side. A hinge point between the first connecting rod and the seat plate on the corresponding side is located at a front end of the seat plate near the riding direction. Two ends of the second swing cross rod are hinged to one end of a second connecting rod through a second universal ball joint mechanism. The other end of the second connecting rod is hinged to a seat plate on a corresponding side. A hinge point between the second connecting rod and the seat plate on the corresponding side is located at a rear end of the seat plate near the riding direction. Two ends of the first fixed cross rod are hinged to one end of a third connecting rod. The other end of the third connecting rod is hinged to a seat plate on a corresponding side. A hinge point between the third connecting rod and the seat plate on the corresponding side is located on the rear end of the seat plate near the riding direction.

Preferably, the support portion includes a first support column disposed along the riding direction.

Preferably, a first shaft sleeve is rotatably provided at a front end of the first support column in the riding direction. The first shaft sleeve is fixedly connected to a middle portion of the first swing cross rod. A second shaft sleeve is rotatably provided at a rear end of the first support column in the riding direction. The second shaft sleeve is fixedly connected to a middle portion of the second swing cross rod. A third shaft sleeve is respectively rotatably provided at two ends of the first fixed cross rod. The third shaft sleeve is fixedly connected to one end of the third connecting rod. A first rotating shaft is fixedly provided at the other end of the third connecting rod. The first rotating shaft is rotatably disposed in a fourth shaft sleeve fixed at the rear end at the bottom of the seat plate in the riding direction. One end of the second connecting rod away from the second swing cross rod is provided with a fifth shaft sleeve matched with the first rotating shaft for rotation. A sixth shaft sleeve is fixedly provided at a front end and at a bottom of the seat plate in the riding direction. A second rotating shaft is rotatably provided in the sixth shaft sleeve. The second rotating shaft is fixedly connected to one end of the first connecting rod away from the first swing cross rod.

Beneficial Effects

The invention includes two seat plates separated from each other. Front ends of the seat plates may rise and fall in an alternating reciprocation mode during riding through linkage of the linkage portion, to prevent continuous pressure on a perineum of the rider in traditional bicycle saddle.

While driving the front ends of the two seat plates to rise and fall in the alternating reciprocation mode, the linkage portion of the present invention may achieve linkage of entire rise of one seat plate during falling of a front end of the other seat plate. Therefore, on the one hand, the entirely rising seat effectively supports a thigh exerting no force of a rider, increasing a contact area, reducing intensity of pressure, and preventing intermittent pressure on the thighs on the two sides by the two seat plates, further improving comfort of the present invention. On the other hand, a height of a thigh exerting no force under the support of the overall rising of the seat plate on the corresponding side is higher than a height of the thigh exerting force, forming a tendency to incline toward the thigh exerting force, reducing a barrier against force transmission from a waist for pedaling feet, and significantly saving labor.

The linkage portion in the present invention can be implemented in a plurality of manners. Without departing from the overall concept of the present invention, a manufacturing enterprise can flexibly select a specific structure of the linkage portion and perform suitable popularization.

Figure 1:
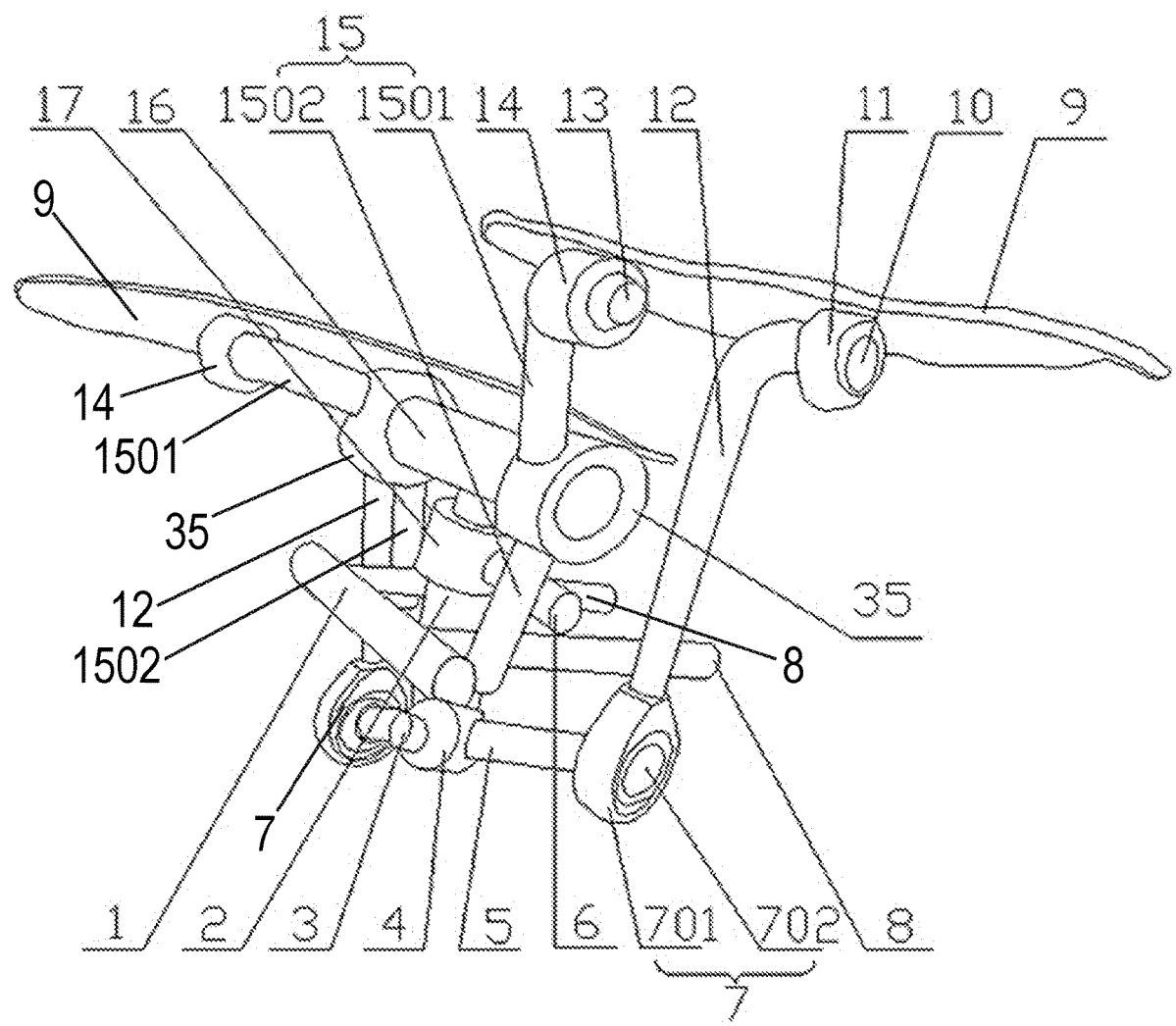
FIG. 1 is a schematic three-dimensional diagram according to an implementation of the present invention.

Reference Numerals 1. Limiting cross rod, 2. First support column, 3. First rotating shaft, 4. First shaft sleeve, 5. First swing cross rod, 6. Second swing cross rod, 7. First universal ball joint mechanism, 701. Ball sleeve, 702. Ball, 8. Sliding rod, 9. Seat plate, 10. Third rotating shaft, 11. Third shaft sleeve, 12. First connecting rod, 13. Fourth rotating shaft, 14. Fourth shaft sleeve, 15. Second connecting rod, 1501. Hinge portion, 1502. Deflector rod portion, 16. First fixed cross rod, 17. Second shaft sleeve, 18. Second universal ball joint mechanism, 19. Second swing cross rod, 20. Second shaft sleeve, 21. First support column, 22. Second connecting rod, 23. Sixth shaft sleeve, 24. Fifth shaft sleeve, 25. Second rotating shaft, 26. Third connecting rod, 27. Fourth shaft sleeve, 28. First rotating shaft, 29. Third shaft sleeve, 30. First connecting rod, 31. First shaft sleeve, 32. First swing cross rod, 33. First universal ball joint mechanism, 34. First fixed cross rod, 35. Fifth shaft sleeve.

DETAILED DESCRIPTION

A multi-degree-of-freedom riding saddle of the present invention includes a support portion and two seat plates 9. Two sliding rods 8 are fixedly provided on the support portion at intervals along a travel direction. The two sliding rods 8 may be connected to a bicycle frame, so that a distance between the present invention and a handlebar may be adjusted. The two seat plates 9 are separated from each other and disposed corresponding to two thighs on two sides of a rider. Through the two separate seat plates 9, continuous pressure on a perineum of the rider by a central protrusion of a traditional bicycle riddle is prevented.

A linkage portion is further disposed on the support portion. The linkage portion is connected to the two seat plates 9 respectively. Through the linkage portion, rising and falling of front ends of the two seat plates 9 in the travel direction in an alternating reciprocation linkage mode are controlled, and a front end of one of the seat plates (9) in the travel direction during falling is controlled to push the other seat plate 9 to rise entirely. For example, a right thigh exerts force for pedaling, the right thigh exerts force and presses down, and a left thigh rises without exerting force. At this time, first the front end and the whole of a seat plate 9 on a right side fall sequentially, and then a front end and the whole of a seat plate 9 on a left side rise sequentially. As a result, the seat plate 9 on the left side supports the height-increased left thigh, and weight of a body of the rider still rests on the two seat plates 9, preventing the intermittent reciprocating and excessive pressure of the two seat plates 9 on thighs on the corresponding sides, improving comfort of the rider. In addition, a height of the left thigh is higher than a height of the right thigh under the support of the overall rising of the seat plate 9 on the left side, forming a tendency to incline toward the right thigh, reducing a barrier of force transmission from a waist to pedaling feet, significantly saving labor.

The present invention is further described in detail through two embodiments below. Obviously, the linkage portion of the present invention can adopt a plurality of structural forms. Embodiments described below are only a part of embodiments of the present invention. Those of ordinary skill in the art can further obtain linkage portions of other structures or a combination of the linkage portions of other structures with the seat plate 9 and the support portion according to the main technical concept of the present invention without contributing creative labor, but such implementations obtained from the main technical concept of the present invention still fall within the protection scope of the present invention.

First embodiment: As shown in FIG. 1, a support portion in this embodiment includes a first support column 2. The first support column 2 is inclined vertically or slightly forward or rearward along the riding direction. Sliding rods 8 are respectively fixedly provided on two sides of the first support column 2 along the riding direction. The sliding rods 8 may be matched with and be fixedly mounted on a joint on a bicycle frame, so that a distance between the present invention and a handlebar may be adjusted.

The linkage portion includes a first swing cross rod 5 rotatably disposed at a lower end of the first support column 2 and a first fixed cross rod 16 fixed at an upper end of the first support column 2. The first swing cross rod 5 and the first fixed cross rod 16 are main linkage components of the linkage portion in this embodiment. The first fixed cross rod 16 is disposed horizontally and perpendicularly to the riding direction. A middle portion of the first fixed cross rod is fixedly connected to an upper end of the first support column 2 by welding. A first rotating shaft 3 is vertically fixed at a lower end of the first support column 2. A first shaft sleeve 4 is rotatably sleeved on the first rotating shaft 3. The first shaft sleeve 4 is fixedly connected to a middle portion of the first swing cross rod 5, so that two ends of the first swing cross rod 5 may swing up and down with the riding direction as a central axis.

Two ends of the first swing cross rod 5 are hinged to one end of the first connecting rod 12 through a first universal ball joint mechanism 7 respectively. The first universal ball joint mechanism 7 includes a ball 702 fixed to one end of the first swing cross rod 5 and a ball sleeve 701 fixed to one end of the first connecting rod 12 and having a cavity corresponding to a shape of the ball 702, so that the ball 702 may turn freely in the ball sleeve 701 without leaving the ball sleeve 701. The other end of the first connecting rod 12 is hinged to a seat plate 9 on a corresponding side. The first connecting rod 12 is hinged to the seat plate 9 on the corresponding side in the following manner: a third shaft sleeve 11 is fixedly provided at a bottom of the seat plate 9 and at a front end in the riding direction. A third rotating shaft 10 is rotatably provided in the third shaft sleeve 11. The third rotating shaft 10 is vertically and fixedly connected to one end of the first connecting rod 12 away from the first swing cross rod 5. Therefore, through matching of the first swing cross rod 5 and two first connecting rods 12, a front end of one of the seat plates 9 in the riding direction pushes, during falling, a front end of the other front seat plate 9 in the riding direction to rise.

A fifth shaft sleeve 35 is respectively provided at two ends of the first fixed cross rod 16. The fifth shaft sleeve 35 is fixedly connected to a middle portion of the second connecting rod 15, so that the second connecting rod 15 may be rotated with the first fixed cross rod 16 as a central axis. In other words, two ends of the second connecting rod 15 may swing freely toward or opposite to the riding direction. An upper end of the second connecting rod 15 is hinged to a seat plate 9 on a corresponding side in the following manner: A fourth shaft sleeve 14 is fixed at a bottom of the seat plate 9 and at a rear end in the riding direction. A fourth rotating shaft 13 is rotatably provided in the fourth shaft sleeve 14. The fourth rotating shaft 13 is vertically and fixedly connected to the upper end of the second connecting rod 15. In this embodiment, a second swing cross rod 6 and a limiting cross rod 1 are respectively provided on two sides of a lower end of the second connecting rod 15. A middle portion of the second swing cross rod 6 is fixed onto the second shaft sleeve 17. The second shaft sleeve 17 is rotatably disposed in the middle portion of the first support column 2. The limiting cross rod 1 is parallel to the first fixed cross rod 16. A middle portion of the first fixed cross rod is fixedly connected to the first support column 2. A travel space at which ends of two second connecting rods 15 away from the seat plate 9 moves is formed between the second swing cross rod 6 and the limiting cross rod 1, so that two ends of the second swing cross rod 6 may be respectively matched with ends of the two second connecting rods 15 away from the seat plate 9. For example, a right thigh still exerts force for pedaling during riding, a front end of a seat plate 9 on a right side falls and a front end of a seat plate 9 on a left side rises through the linkage of the first swing cross rod 5 and the two first connecting rods 12. As the right thigh continues to press down, a rear end of the seat plate 9 on the right side also falls, causing the seat plate 9 on the right side to fall entirely. At this time, a lower end of the second connecting rod 15 on the right side pushes a right end of the second swing cross rod 6, so that the second swing cross rod 6 rotates counterclockwise. Then, a left end of the second swing cross rod 6 pushes a lower end of the second connecting rod 15 on the left side, so that a rear end of the seat plate 9 on the left side rises, further causing the seat plate 9 on the left side to rise entirely to match the seat plate 9 on the right side that falls entirely, so that the rider is inclined toward the right side.

The second connecting rod 15 in this embodiment includes a hinge portion 1501 fixed onto an fifth shaft sleeve 35 and fixed to a fourth rotating shaft 13, and a deflector rod portion 1502 fixed onto the fifth shaft sleeve 35 and matched with the limiting cross rod 1. An included angle between the hinge portion 1501 and the deflector rod portion 1502 is 150°-160°, so that a space can be utilized effectively and a height difference between the seat plates 9 on the left and right sides can be increased.

Figure 2:
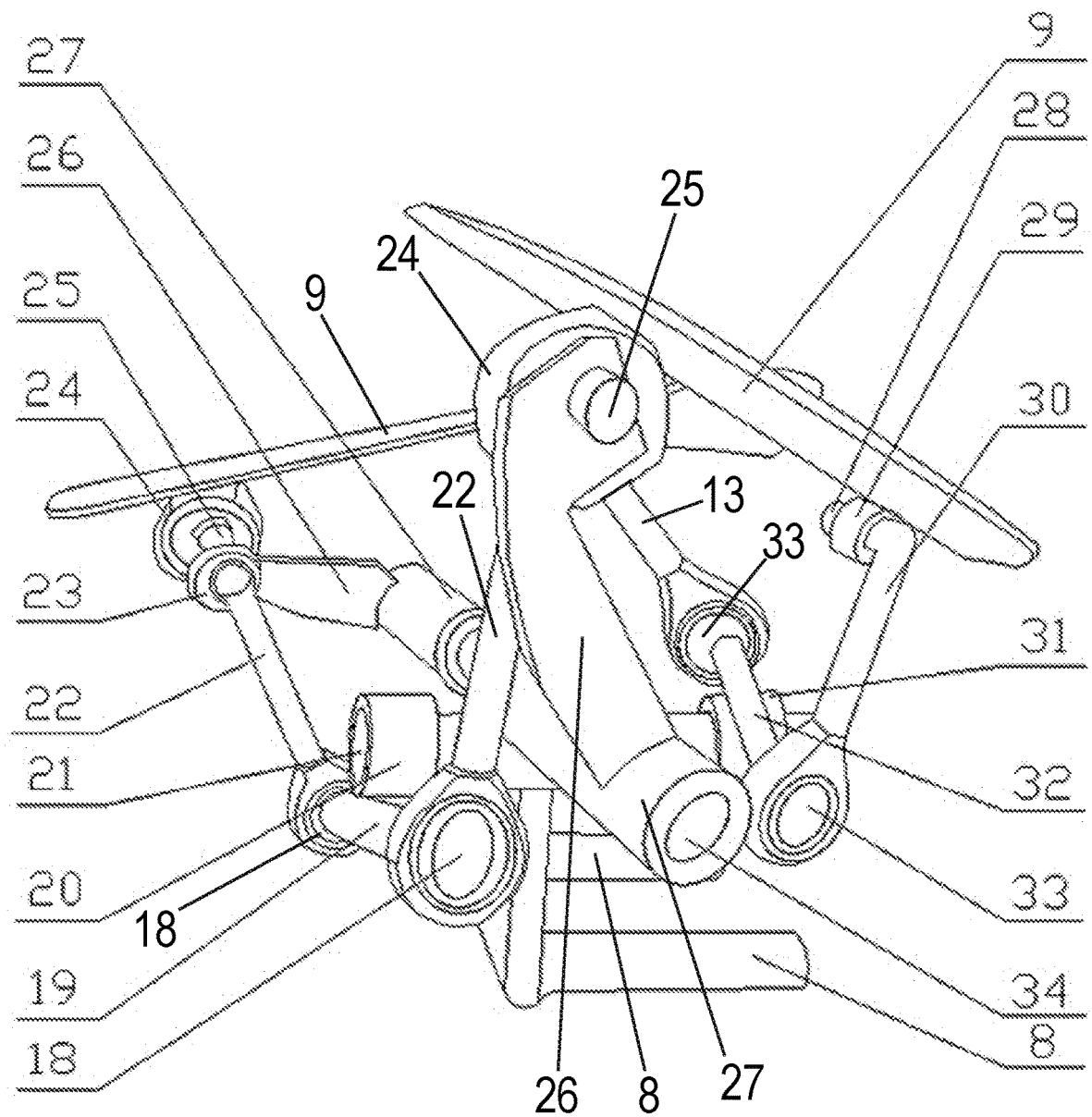
FIG. 2 is a schematic three-dimensional diagram according to another implementation of the present invention.

Second embodiment: As shown in FIG. 2, a support portion in this embodiment includes a second support column 21 disposed along a riding direction or with both ends slightly inclined upward or downward. Sliding rods 8 are respectively fixedly provided on two sides of the second support column 21 along the riding direction. The sliding rods 8 may be matched with and be fixedly mounted on a joint on a bicycle frame, so that a distance between the present invention and a handlebar may be adjusted.

The linkage portion includes a first swing cross rod 32 rotatably disposed at a front end of the first support column 21, a second swing cross rod 19 rotatably disposed at a rear end of the first support portion, and a first fixed cross rod 34 fixed onto the first support column 21 and located between the first swing cross rod 32 and the second swing cross rod 19. The first swing cross rod 32, the second swing cross rod 19, and the first fixed cross rod 34 are main components of the linkage portion in this embodiment. A first shaft sleeve 31 is rotatably provided at a front end of the first support column 21. The first shaft sleeve 31 is fixedly connected to a middle portion of the first swing cross rod 32. A second shaft sleeve 20 is rotatably provided at a rear end of the first support column 21. The second shaft sleeve 20 is fixedly connected to a middle portion of the second swing cross rod 19, so that two ends of the first swing cross rod 32 and the second swing cross rod 19 can swing up and down with the riding direction as a central axis. The first fixed cross rod 34 is disposed horizontally and perpendicularly to the riding direction. A middle portion of the first fixed cross rod is fixedly connected to the first support column 21 by welding.

Two ends of the first swing cross rod 32 are hinged to one end of a first connecting rod 30 through a first universal ball joint mechanism 33. The first universal ball joint mechanism 33 is similar to the first universal ball joint mechanism 7 in the first embodiment. The other end of the first connecting rod 30 is hinged to a seat plate 9 on a corresponding side in the following manner: A third shaft sleeve 29 is fixedly provided and at a bottom of the seat plate 9 and at a front end in the riding direction. A first rotating shaft 28 is rotatably disposed in the third shaft sleeve 29. The first rotating shaft 28 is vertically and fixedly connected to one end of the first connecting rod 30 away from the first swing cross rod 32.

Two ends of the second swing cross rod 19 are respectively hinged to one end of a second connecting rod 22 through a second universal ball joint mechanism 18. The second universal ball joint mechanism 18 is similar to the first universal ball joint mechanism 7 in the first embodiment. The other end of the second connecting rod 22 is hinged to the seat plate 9 on the corresponding side.

A fourth shaft sleeve 27 is respectively rotatably provided at two ends of the first fixed cross rod 34. The fourth shaft sleeve 27 is fixedly connected to one end of a third connecting rod 26. The other end of the third connecting rod 26 is hinged to a seat plate 9 on the corresponding side. A joint point between the third connecting rod 26 and the second connecting rod 22 and the seat plate 9 on the corresponding side is a common node. The hinging is performed in the following manner: A second rotating shaft 25 is fixedly provided at one end of the third connecting rod 26 away from the fourth shaft sleeve 27. The second rotating shaft 25 is rotatably disposed in the fifth shaft sleeve 24 fixed at the rear end at the bottom of the seat plate 9 in the riding direction. A sixth shaft sleeve 23 rotatably matched with the second rotating shaft 25 is provided at one end of the second connecting rod 22 away from the second swing cross rod 19.

During implementation of the second embodiment, for example, the right thigh still exerts force for pedaling during riding. Through the linkage of the first swing cross rod 32 and the two first connecting rods 30, after a front end of the seat plate 9 on the right side falls and a front end of the seat plate 9 on the left side rises, as the right thigh continually presses down, a rear end of the seat plate 9 on the right side also falls, so that the seat plate 9 on the right side falls entirely. At this time, the second connecting rod 22 on the right side is matched with the third connecting rod 26, so that a lower end of the second connecting rod 22 pushes a right end of the second swing cross rod 19, and the second swing cross rod 19 rotates clockwise. Then, a left end of the second swing cross rod 19 pushes a lower end of the second connecting rod 22 on the left side, causing a rear end of the seat plate 9 on the left side to rise, further causing the seat plate 9 on the left side to rise entirely, to be matched with the seat plate 9 on the right side that falls entirely, thereby causing the rider to form a tendency to incline toward the right side.

In the two embodiments of the present invention, a thrust bearing may be disposed between each rotating shaft and teach shaft sleeve, and between each support column and each shaft sleeve, so as to reduce frictional pause and improve flexibility of linkage of various accessories in the present invention.

What is claimed is:
1. A multi-degree-of-freedom riding saddle, comprising:
   a support portion configured to connect to a bicycle frame;
   a first seat plate and a second seat plate disposed on opposing sides of the support portion, wherein the first and the second seat plates are configured to support a first and a second thigh of a rider, respectively; and
   a mechanical linkage operatively connecting the first and the second seat plates to the support portion, such that the first and the second seat plates each comprise a floating link of the mechanical linkage, the mechanical linkage further comprising:
      a respective first connecting rod coupled to a front end of each seat plate at a respective first moving hinge,
      a respective second connecting rod coupled to a rear end of each seat plate at a respective second moving hinge,
      a first swing cross rod rotatably coupled to the support portion and configured to connect the first connecting rods to each other such that a lowering of the front end of one of the first or the second seat plate causes the front end of the other of the first or the second seat plate to rise, and
      a second swing cross rod rotatably coupled to the support portion and configured to connect the second connecting rods to each other such that a lowering of the rear end of one of the first or the second seat plate causes the rear end of the other of the first or the second seat plate to rise.

2. The multi-degree-of-freedom riding saddle of claim 1, wherein the mechanical linkage further comprises a first cross rod fixedly coupled to the support portion.

3. The multi-degree-of-freedom riding saddle of claim 2, wherein the second connecting rod of the first seat plate is rotatably coupled to a first end of the first cross rod and the second connecting rod of the second seat plate is rotatably coupled to a second end of the first cross rod.

4. The multi-degree-of-freedom riding saddle of claim 2, wherein a respective third connecting rod is coupled to the rear end of each seat plate, and the third connecting rod of the first seat plate is rotatably coupled to a first end of the first cross rod and the third connecting rod of the second seat plate is rotatably coupled to a second end of the first cross rod.

5. The multi-degree-of-freedom riding saddle of claim 1, wherein the mechanical linkage is configured to allow simultaneous lowering of the front end and the rear end of the first seat plate.

6. The multi-degree-of-freedom riding saddle of claim 5, wherein the mechanical linkage is configured such that simultaneous lowering of the front end and the rear end of the first seat plate causes simultaneous raising of the front end and the rear end of the second seat plate.

7. The multi-degree-of-freedom riding saddle of claim 1, wherein the first connecting rod of the first seat plate is coupled to a first end of the first swing cross rod and the first connecting rod of the second seat plate is coupled to a second end of the first swing cross rod.

8. The multi-degree-of-freedom riding saddle of claim 7, wherein each first connecting rod is coupled to the respective end of the first swing cross rod by a respective first universal ball joint.

9. The multi-degree-of-freedom riding saddle of claim 1, wherein the second connecting rod of the first seat plate is rotatably coupled to a first end of the second swing cross rod and the second connecting rod of the second seat plate is rotatably coupled to a second end of the second swing cross rod.

10. The multi-degree-of-freedom riding saddle of claim 1, wherein the support portion includes a first support column.

11. The multi-degree-of-freedom riding saddle of claim 10, wherein the first swing cross rod is rotatably coupled to a first end of the first support column, and the second swing cross rod is rotatably coupled to a second end of the first support column.

* * * * *